United States Patent
Sano et al.

(10) Patent No.: US 6,903,884 B2
(45) Date of Patent: Jun. 7, 2005

(54) OPTICAL DEVICE AND FIXING MEMBER USED IN THE DEVICE

(75) Inventors: Tomomi Sano, Kanagawa (JP); Hiroshi Suganuma, Kanagawa (JP); Tatsuhiko Tanaka, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/705,848

(22) Filed: Nov. 13, 2003

(65) Prior Publication Data

US 2004/0120054 A1 Jun. 24, 2004

(30) Foreign Application Priority Data

Nov. 15, 2002 (JP) ....................................... 2002-332386

(51) Int. Cl.⁷ ............................................... G02B 7/02
(52) U.S. Cl. ...................................... 359/819; 359/827
(58) Field of Search .............................. 359/819, 827

(56) References Cited

U.S. PATENT DOCUMENTS 4,381,884 A * 5/1983 Houle ......................... 359/831
6,554,244 B1 * 4/2003 Remy De Graffenried et al. ... 248/694

FOREIGN PATENT DOCUMENTS

| JP | 7-140361 | 6/1995 |
| JP | 8-122578 | 5/1996 |

* cited by examiner

*Primary Examiner*—David N. Spector
(74) *Attorney, Agent, or Firm*—McDermott Will & Emery LLP

(57) ABSTRACT

An object of the present invention is to provide a fixing structure for an optical element, which structure enables easy adjustment of a direction of the optical element when the optical element is fixed to a substrate. In order to achieve this object, a fixing member 31 made of metal is fixed to a substrate such that the fixing member holds an optical element therein and the bottom surface of the fixing member is spherical so that the spherical bottom surface touches the edge of the opening of a fixing portion on the substrate. The fixing member holds the optical element. A part of the surface of the fixing member is spherical such that the spherical part of the surface touches the edge of the opening of a fixing portion on the substrate. An optical device in which an optical element is fixed to a substrate with the fixing member mentioned above is also provided.

9 Claims, 4 Drawing Sheets

US 6,903,884 B2

OPTICAL DEVICE AND FIXING MEMBER USED IN THE DEVICE

BACKGROUND OF THE INVENTION

1. Field of the Invention

This invention relates to an optical device and a fixing member that is used in the device.

2. Description of the Background Art

As shown in Japanese patent application publication H7-140361, for example, an optical element such as a total reflection mirror in a Michelson interferometer is fixed to a desired substrate so as to be used as an optical device.

When an optical element is fixed to a substrate, it is necessary to adjust the position of the optical element in terms of direction thereof. In the case where the optical element is a mirror, the direction of the optical element must be adjusted such that an incident angle of a desired value may be obtained, because the light path of the reflected light is determined by the incident angle.

SUMMARY OF THE INVENTION

It is an object of the present invention to provide an optical device and a fixing member used in the optical device, in which an optical element can be adjusted easily in terms of the direction thereof when the optical element is fixed to a substrate.

In order to achieve this object, a fixing member for holding the optical element has a structure such that the bottom surface of the fixing member is spherical to touch a fixing portion of the substrate at the edge of an opening of the fixing portion. The present invention also provides an optical device in which an optical element is fixed to a substrate with the fixing member described above.

Another aspect of the present invention is a method of making an optical device in which an optical element is fixed to a substrate with a fixing member. In the method, a substrate having an opening in the fixing portion thereof and a fixing member having a spherical bottom surface and holding the optical element therein are prepared. While the spherical surface is in contact with the edge of the opening of the fixing portion, a direction of the fixing member is adjusted and the fixing portion of the substrate and the fixing member are fixed together by welding.

Advantages of the present invention will become readily apparent from the following detailed description, which is an exemplary illustration of the best mode for carrying out the invention. The invention is capable of other and different embodiments, the details of which are capable of modifications in various obvious respects, all without departing from the invention. Accordingly, the drawing and description are illustrative in nature, not restrictive.

BRIEF DESCRIPTION OF THE DRAWING

The present invention is illustrated by way of example, and not by way of limitation, in the figures of the accompanying drawing and in which like reference numerals refer to similar elements.

DETAILED DESCRIPTION OF THE INVENTION

Figure 1:
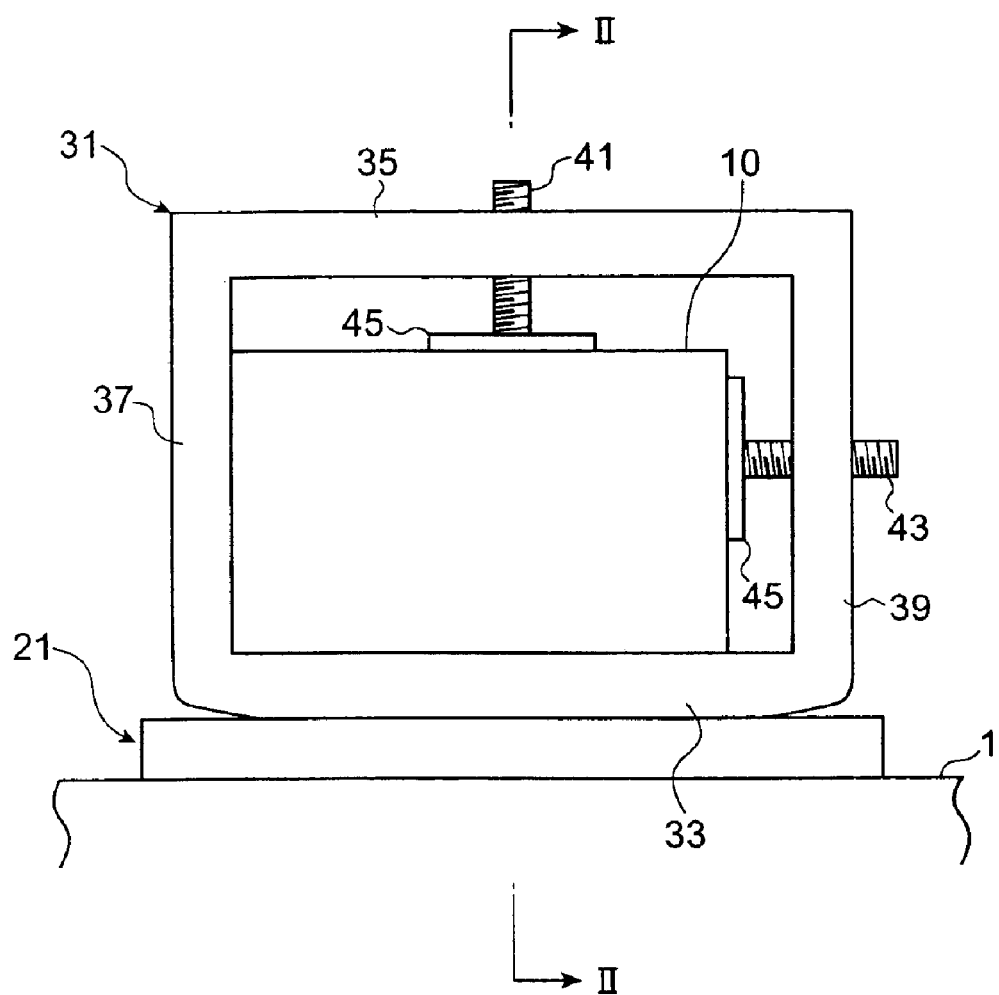
FIG. 1 is a front view showing an embodiment of an optical device according to the invention.
Figure 2:
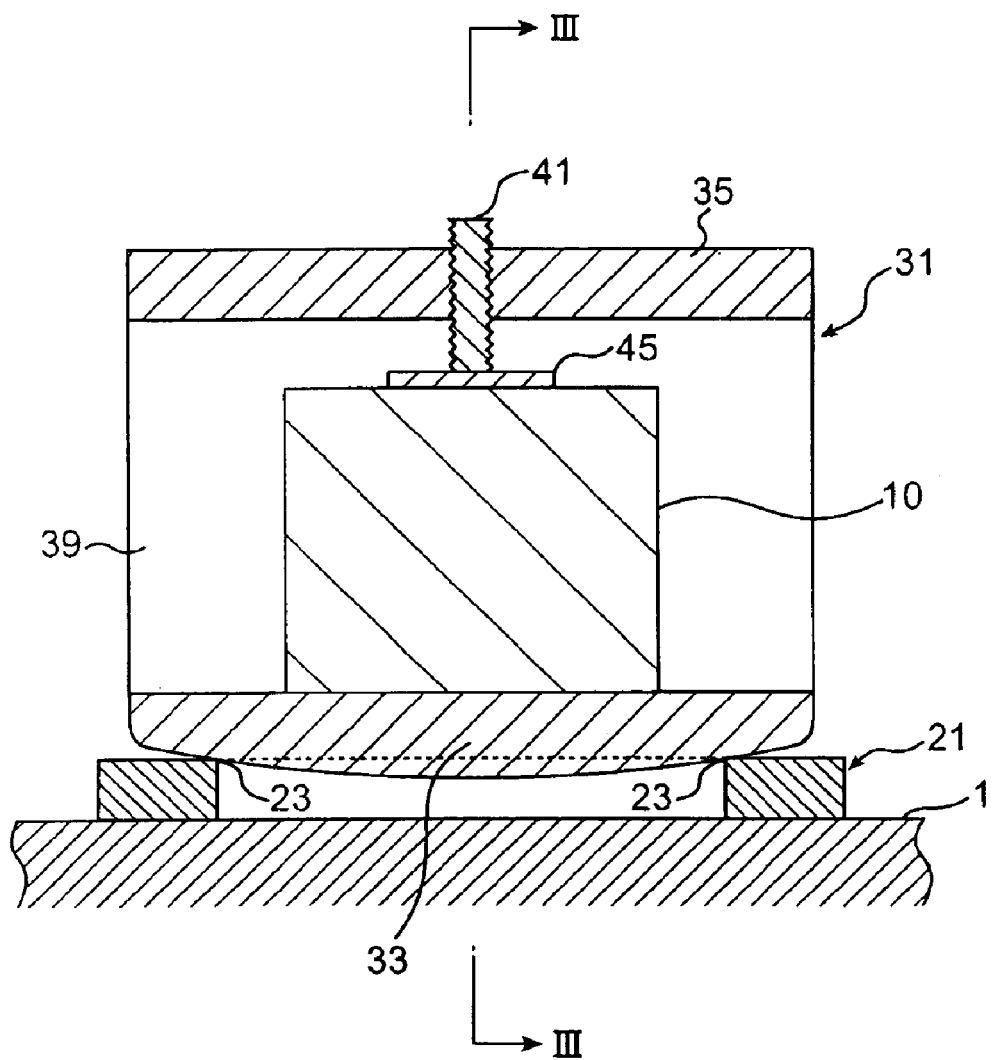
FIG. 2 is a cross section along the II—II line of FIG. 1.
Figure 3:
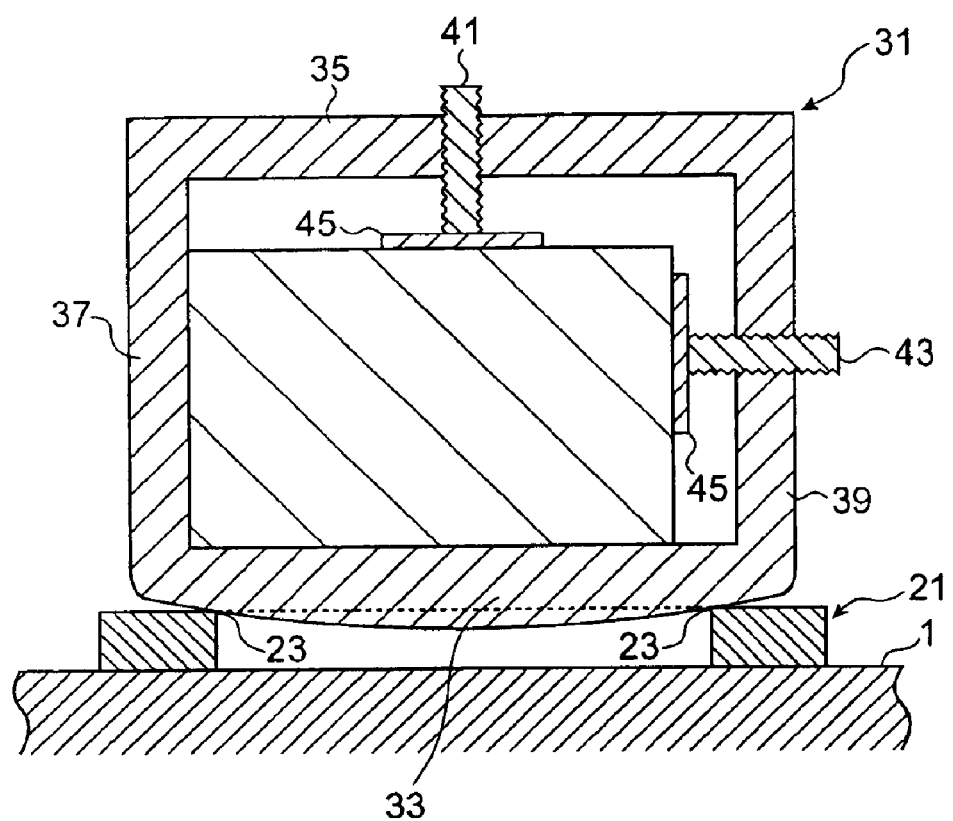
FIG. 3 is a cross section along the III—III line of FIG. 2.

First, referring to FIGS. 1 to 3, an optical device of this invention is explained. FIG. 1 is a front view showing an embodiment of an optical device according to the invention, FIG. 2 is a cross section along the II—II line of FIG. 1, and FIG. 3 is a cross section along the III—III line of FIG. 2.

In the optical device shown in FIGS. 1 to 3, an optical element 10 such as a total reflection mirror in a Michelson interferometer is fixed to a substrate 1 with a fixing member 31. In this embodiment, the optical element 10 presents a quadratic pillar shape, but it is not limited to this shape. The substrate 1 consists of metallic material, SUS 304 stainless steel, for example.

A pedestal 21 made of metal having a cylindrical shape is fixed to the substrate 1 by welding in the state in which one end face thereof is in contact with the substrate 1 so as to form a fixing portion. The fixing member 31 made of metal is fixed to the pedestal 21 by welding. The fixing member 31 has the bottom 33, which touches the pedestal 21, the top 35 facing the bottom 33, and the side portions 37 and 39 extending vertically from the circumference of the bottom 33 to the top 35. The bottom 33 has a spherical shaped portion, which contacts with the edge of the opening of the pedestal.

The angle formed at the corner between the bottom 33 and the side portion 37 or 39 is designed to be equal to the angle formed at the edge by given faces of the optical element 10. In this embodiment, the angle of the corner is set to be 90°. One edge of the optical element 10 described above fits in the inner corner between the bottom 33 and one of the side portions 37 or 39, which results in the positioning of the optical element 10. In the case where the optical element 10 has a polygonal pillar shape, the bottom surface and one or more side faces of the optical element may fittingly contact with the fixing member 31. In the case where the optical element 10 has a columnar shape, the bottom plane and two circumferential surface points of the optical element 10 may fittingly contact with the fixing member.

A screw 41 is fitted in a female screw portion formed in the top 35, and a screw 43 is fitted in a female screw portion formed in the side portion 39 facing the side portion 37. In the state that an edge of the optical element 10 fits in a corner between the bottom 33 and the side portion 37, the optical element 10 is pushed and fixed to the fixing member 31 by the screws 41 and 43. In this way, the fixing member 31 holds the optical element 10 further securely.

Shims (metal pieces) 45 are placed between the optical element 10 and the screws 41 and 43. The pressing force from the screws 41 and 43 are introduced to the optical element 10 through the shims 45. The optical element 10 does not contact with the screws 41 and 43 directly and does not suffer a damage. The shims 45 can be made of SUS 304 stainless steel, for example.

A pressing force from the screws 41 and 43 acts on the sides other than the sides on which light is incident and/or from which light is emitted. The fixing member 31 can therefore hold the optical element 10 without obstructing the incident light and emitted light of the optical element 10.

In addition, the clamping torque of the screws 41 and 43 is set and controlled in a range that does not damage the optical characteristics of the optical element 10. Thus, the fixing member 31 can hold the optical element 10 without obstructing the input of incident light and the output of emitted light of the optical element 10. In the case the optical element 10 is a total reflection mirror in a Michelson interferometer, the clamping torque is set in a range that does not affect reflectivity, that is, about 3 Nm, for example.

Next, an embodiment of a method of fixing an optical element according to this invention is explained. First, the optical element 10 is fixed to a fixing member 31 by screws 41 and 43. While each of two sides of the optical element 10 come in contact with the bottom 33 and a side portion 37, one screw 41 is fitted to a female screw portion in the top portion 35 and tightened, and the other screw 43 is fitted to a female screw portion in the side portion 39 and tightened. In this way, the optical element 10 is positioned and held in the fixing member 31.

A pedestal 21 is positioned and fixed by welding on a substrate 1 to form a fixing portion. It is preferable that the pedestal 21 and the substrate 1 be laser welded with a Nd-YAG laser.

Figure 4:
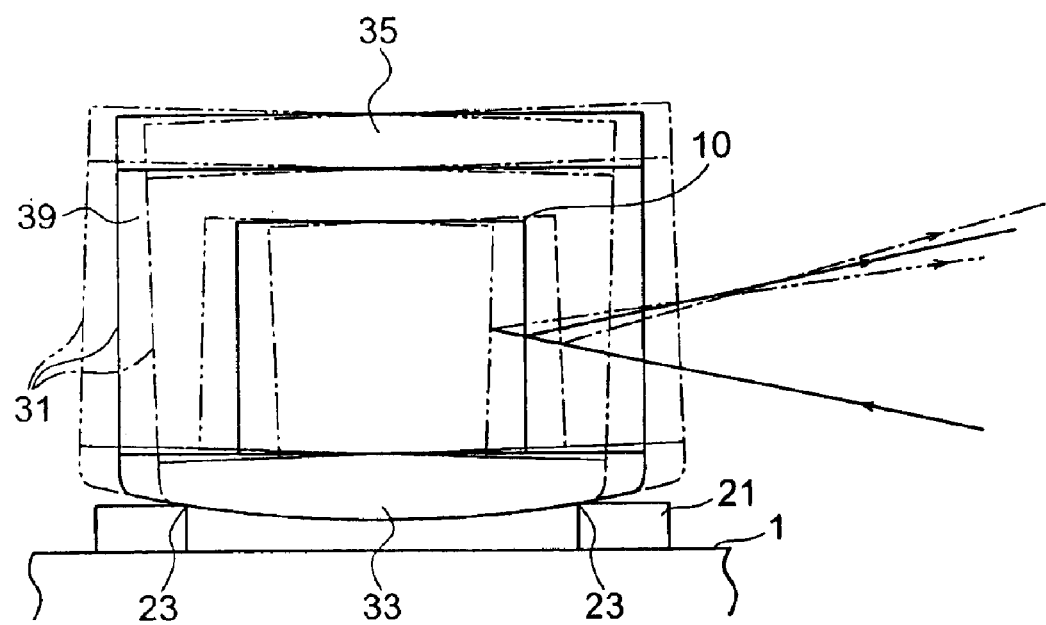
FIG. 4 is a schematic view showing states in which a direction of the optical element in the optical device shown in FIG. 1 is adjusted.

Second, the fixing member 31 in which the optical element 10 is held is placed on the pedestal 21 such that the spherical shaped portion of the bottom 33 touches the edge 23 of the opening of the pedestal 21. As shown in FIG. 4, while the edge 23 acts as a fulcrum, a direction of the fixing member 31, that is, a direction of the optical element 10 is adjusted, and the reflected light from the optical element 10 is adjusted to coincide with the desired direction. FIG. 4 is a schematic view to explain the adjustment of alignment according to this embodiment (the screws 41 and 43 and the shims 45 are omitted from the figure).

When adjustment of a direction of the optical element 10 is finished, the pedestal 21 and the fixing member 31 are fixed by welding. It is preferable that the pedestal 21 and the fixing member 31 be laser welded with a Nd-YAG laser.

In the welding of the pedestal 21 and the fixing member 31 as well as the welding of the pedestal 21 and the substrate 1, the welded workpieces are moved by a shock of the welding. However, such displacement is extremely small and a discrepancy of position can be considerably reduced as compared with the case where displacement is caused by resinous hardening shrinkage when the workpieces are fixed by resin. In addition, the time needed for fixing can be markedly shortened.

Considering the displacement of the work pieces by a shock in welding, the strength and the position of a Nd-YAG laser beam of laser welding are appropriately determined depending on the materials and shapes of the workpieces. In addition, a carbon dioxide laser may be used to substitute a Nd-YAG laser as a power source. It is preferable that the workpieces be laser welded with a Nd-YAG laser at, at least, two points. By this, the workpieces can be fixed more securely. In addition, when plural welding is done with a Nd-YAG laser, a displacement produced by the first point laser welding with a Nd-YAG laser can be repaired by the following welding with a Nd-YAG laser at another point.

In this embodiment, since the pedestal 21 has a cylindrical shape and the fixing member 31 has a surface of spherical shape which touches the pedestal 21 at the edge 23 of the opening of the pedestal 21, the direction of the fixing member 31 can be freely adjusted and high accuracy in the adjustment of alignment can be achieved. In addition, the structure of the fixing member is simple, enabling easy operation, and increased production efficiency.

In addition, the optical element 10 is pressed and fixed to the fixing member 31 with the screws 41 and 43 in this embodiment. By selecting a clamping torque of the screws 41 and 43, the optical element 10 can easily be fixed to the fixing member 31 under a constant pressing force, irrelevant to variations in the accuracy of shapes of the optical element 10 and the fixing member 21.

While this invention has been described in connection with what is presently considered to be the most practical and preferred embodiments, the invention is not limited to the disclosed embodiments, but contrarily, is intended to cover various modifications and equivalent arrangements included within the spirit and scope of the appended claims. For example, fixing the optical element 10 to the fixing member 31 may be achieved with a force of a spring member located between the optical element 10 and the fixing member 31. A fixing portion may be formed with a substrate itself, without adopting the pedestal 21.

The entire disclosure of Japanese Patent Application No. 2002-332386 filed on Nov. 15, 2002 including the specification, claims, drawings, and summary are incorporated herein by reference in its entirety.

What is claimed is:

1. An optical device having a substrate and an optical element fixed to said substrate with a fixing member, said fixing member holding the optical element therein and the bottom surface of said fixing member being spherical to touch a fixing portion of said substrate at the edge of an opening of said fixing portion, wherein said fixing portion is a cylindrical pedestal fixed to the substrate, said substrate is metal, said pedestal is metal and fixed to said substrate by welding, and said fixing member is metal and fixed to said pedestal by welding.

2. An optical device having a substrate and an optical element fixed to said substrate with a fixing member, said fixing member holding the optical element therein and the bottom surface of said fixing member being spherical to touch a fixing portion of said substrate at the edge of an opening of said fixing portion, wherein said fixing portion is a cylindrical pedestal fixed to the substrate and said optical element is pressed and fixed to said fixing member by a screw.

3. An optical device according to claim 2, wherein a metal piece is inserted between said optical element and said screw.

4. A method of making an optical device in which an optical element is fixed to a substrate with a fixing member, comprising:

preparing a substrate having an opening in a fixing portion thereof, and a fixing member holding the optical element therein, the bottom surface of said fixing member being spherical;

adjusting a direction of said fixing member while the spherical bottom surface of said fixing member is in contact with the edge of the opening of said fixing portion of the substrate; and fixing said fixing member to said fixing portion, wherein said fixing portion is a cylindrical pedestal fixed to the substrate.

5. A method of making an optical device in which an optical element is fixed to a substrate with a fixing member, comprising:

preparing a substrate having an opening in a fixing portion thereof, and a fixing member holding the optical element therein, the bottom surface of said fixing member being spherical;

adjusting a direction of said fixing member while the spherical bottom surface of said fixing member is in contact with the edge of the opening of said fixing portion of the substrate; and fixing said fixing member to said fixing portion, wherein said fixing is done by welding.

6. A method of making an optical device according to claim 4, wherein said pedestal and said substrate are laser welded by a Nd-YAG laser.

7. A method of making an optical device according to claim 4, wherein said pedestal and said substrate are laser welded by a Nd-YAG laser at, at least, two points.

8. A method of making an optical device according to claim 4, wherein said pedestal and said substrate are laser welded by a Nd-YAG laser.

9. A method of making an optical device according to claim 4, wherein said pedestal and said fixing member are laser welded by a Nd-YAG laser at, at least two points.

\* \* \* \* \*